(12) United States Patent
Arbery

(10) Patent No.: US 11,438,062 B2
(45) Date of Patent: Sep. 6, 2022

(54) OPTICAL AND RADIO FREQUENCY TERMINAL FOR SPACE-TO-GROUND COMMUNICATIONS

(71) Applicant: HONEYWELL LIMITED HONEYWELL LIMITÉE, Mississauga (CA)

(72) Inventor: Graham Martin Arbery, Cambridge, CA (US)

(73) Assignee: Honeywell Limited Honeywell Limitée, Mississauga (CA)

( * ) Notice: Subject to any disclaimer, the term of this patent is extended or adjusted under 35 U.S.C. 154(b) by 0 days.

(21) Appl. No.: 17/085,107

(22) Filed: Oct. 30, 2020

(65) Prior Publication Data
US 2022/0140902 A1    May 5, 2022

(51) Int. Cl.
*H04B 10/112* (2013.01)
*H04B 10/118* (2013.01)
(Continued)

(52) U.S. Cl.
CPC ......... *H04B 10/1125* (2013.01); *H01Q 15/14* (2013.01); *H04B 1/38* (2013.01);
(Continued)

(58) Field of Classification Search
None
See application file for complete search history.

(56) References Cited

U.S. PATENT DOCUMENTS

| 2,972,743 A | 2/1961 | Svensson et al. |
| 4,477,814 A | 10/1984 | Brumbaugh et al. |

(Continued)

FOREIGN PATENT DOCUMENTS

| EP | 2760081 A1 | 7/2014 |
| EP | 2760082 A1 | 7/2014 |
| GB | 2510162 A | 7/2014 |

OTHER PUBLICATIONS

Charles et al. "Hybrid RF / Optical Communication Terminal with Spherical Primary Optics for Optical Reception" 2011 International Conference on Space Optical Systems and Applications.
(Continued)

*Primary Examiner* — Darren E Wolf
(74) *Attorney, Agent, or Firm* — Bereskin & Parr LLP/S.E.N.C.R.L., s.r.l.; T. Cameron Gale

(57) ABSTRACT

Disclosed are systems for transmitting and receiving a radio frequency (RF) signal and an optical signal. One system may include a communication terminal comprising a primary concave reflector providing a first focal length to a focal point, and a secondary concave reflector providing a second focal length to the focal point. The communication terminal may further comprise an optical transceiver facing the secondary concave reflector, and one or more RF transceivers facing the primary concave reflector. The optical transceiver may be configured to transmit and receive the optical signal via the primary and secondary concave reflectors through the focal point, and the one or more RF transceivers may be configured to transmit and receive the RF signal via the primary concave reflector. The one or more RF transceivers may be positioned adjacent to the focal point and offset from a path of the optical signal.

20 Claims, 4 Drawing Sheets

(51) Int. Cl.
*H01Q 15/14* (2006.01)
*H04B 1/38* (2015.01)
*H04B 10/40* (2013.01)
*H04B 10/43* (2013.01)

(52) U.S. Cl.
CPC ............ *H04B 10/118* (2013.01); *H04B 10/40* (2013.01); *H04B 10/43* (2013.01)

(56) References Cited

U.S. PATENT DOCUMENTS

| | | | | |
|---|---|---|---|---|
| 5,327,149 | A * | 7/1994 | Kuffer | G01S 13/86 |
| | | | | 342/53 |
| 5,465,170 | A * | 11/1995 | Arimoto | H04B 10/118 |
| | | | | 398/129 |
| 6,225,955 | B1 * | 5/2001 | Chang | H01Q 19/13 |
| | | | | 343/720 |
| 6,320,553 | B1 | 11/2001 | Ergene | |
| 6,801,172 | B1 | 10/2004 | Schwengler | |
| 7,471,255 | B2 | 12/2008 | Welch | |
| 8,094,081 | B1 | 1/2012 | Bruzzi et al. | |
| 8,989,584 | B2 | 3/2015 | Ruggiero et al. | |
| 9,865,921 | B2 | 1/2018 | Griffith et al. | |
| 2011/0262145 | A1 * | 10/2011 | Ruggiero | H01Q 15/0033 |
| | | | | 398/115 |
| 2012/0002973 | A1 | 1/2012 | Bruzzi et al. | |
| 2012/0080552 | A1 * | 4/2012 | Taylor | G02B 5/08 |
| | | | | 244/3.16 |
| 2017/0031068 | A1 | 2/2017 | Crawford et al. | |

OTHER PUBLICATIONS

Extended European Search Report dated Mar. 15, 2022 issued in EP Patent Application No. 21205273.2 (6 pages).

* cited by examiner

OPTICAL AND RADIO FREQUENCY TERMINAL FOR SPACE-TO-GROUND COMMUNICATIONS

TECHNICAL FIELD

The present disclosure relates to a terminal for space-to-ground communications. More particularly, the present disclosure discusses various configurations of a terminal providing optical and radio frequency (RF) connectivity.

BACKGROUND

Conventional terminals providing both optical and RF connectivity within a single terminal may suffer from a principal difficulty which is the need to prevent the RF components from blocking the optical path, and vice-versa. Accordingly, there is a need for an improved structure for such antenna terminals.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

According to certain aspects of the disclosure, systems and methods are disclosed for transmitting and receiving a radio frequency (RF) signal and an optical signal via a single terminal.

In one aspect, an antenna is disclosed for transmitting and receiving an RF signal and an optical signal. The antenna may include: a primary concave reflector configured to provide a first focal length to a focal point; a secondary concave reflector configured to provide a second focal length to the focal point, wherein the focal point is located between the primary concave reflector and the secondary concave reflector, and wherein the first focal length is longer than the second focal length; an optical transceiver facing the secondary concave reflector, wherein the optical transceiver is configured to transmit and receive the optical signal via the primary and secondary concave reflectors, wherein a path of the optical signal passes through the focal point; one or more RF transceivers facing the primary concave reflector, wherein the one or more RF transceivers are positioned adjacent to the focal point and offset from the optical signal path, and wherein the one or more RF transceivers are configured to transmit and receive the RF signal via the primary concave reflector; and a controller configured to selectively activate the optical transceiver and/or the one or more RF transceivers.

In another aspect, there is provided a communication terminal. The communication terminal may comprise a primary concave reflector configured to provide a first focal length to a focal point; a secondary concave reflector configured to provide a second focal length to the focal point, wherein the focal point is located between the primary concave reflector and the secondary concave reflector; an optical transceiver facing the secondary concave reflector, wherein the optical transceiver is configured to transmit and receive the optical signal via the primary and secondary concave reflectors through the focal point; one or more RF transceivers facing the primary concave reflector, wherein the one or more RF transceivers are positioned adjacent to the focal point and offset from a path of the optical signal, and wherein the one or more RF transceivers are configured to transmit and receive the RF signal via the primary concave reflector.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

Embodiments of the present disclosure will now be described, by way of example only, with reference to the accompanying drawings in which.

DETAILED DESCRIPTION

Figure 1:
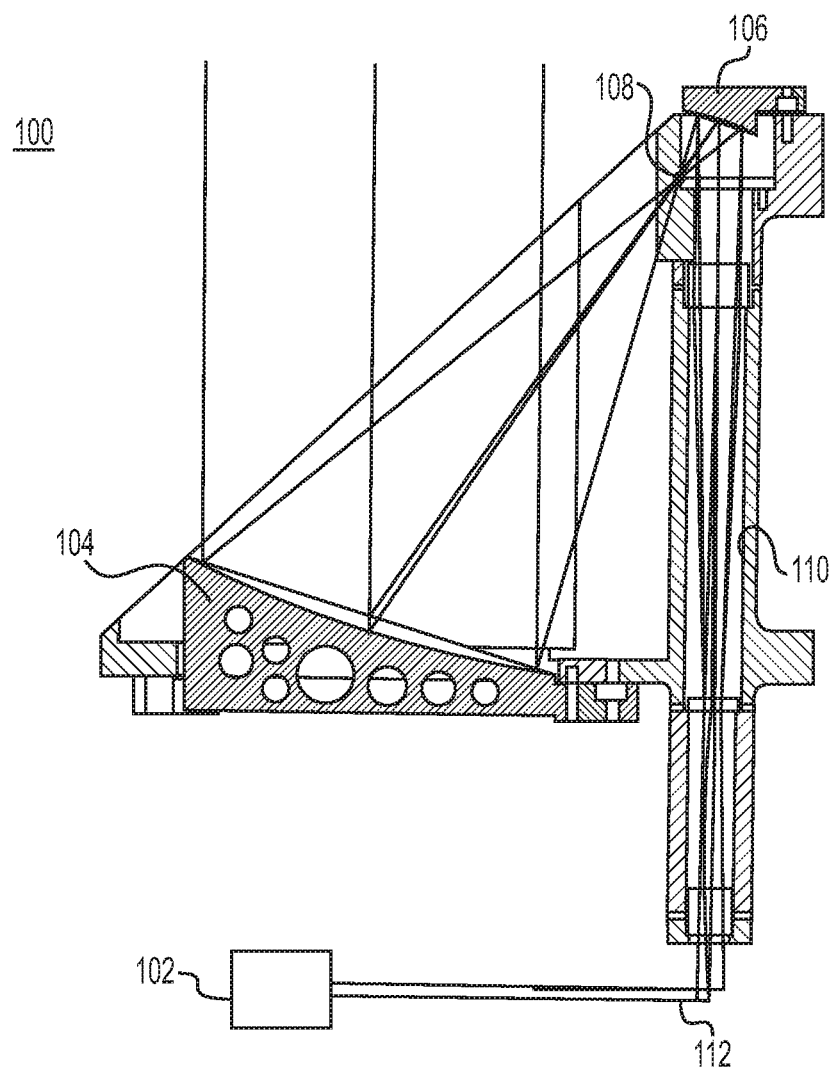
FIG. 1 depicts a cross sectional view of an exemplary terminal including an optical transceiver, according to some embodiments.

The following embodiments describe various configurations of a terminal providing optical and radio frequency (RF) connectivity.

Satellite-mounted optical terminals may be used for intersatellite and Low Earth Orbit (LEO)-to-ground applications. For LEO-to-ground applications, an optical link established by the satellite-mounted optical terminals may have high sensitivity to blockage by clouds. In such instances, a backup RF link capability may be utilized to maintain connection through the clouds at a lower data rate when the optical link is unavailable, e.g., when the optical link is blocked by the clouds. The embodiments disclosed herein describe a single terminal including both the optical and RF transceivers. In some embodiments, a terminal may include an optical transceiver comprising a parabolic mirror and a coarse steering mechanism. In such embodiments, the terminal may further include an RF transceiver, for example, one or more feed horns, which may enable the terminal to function as a Ka band antenna. In some embodiments, the RF transceiver and the optical transceiver may share one or more components, e.g., gimbal drive, DC converters, command, telemetry, etc. In some embodiments, the terminal including both the optical transceiver and the RF transceiver may provide RF link capability as a back up to the optical link capability, and vice versa. That is, the embodiments disclosed herein provide a terminal including both an optical transceiver and an RF transceiver that may automatically switch from optical link capability to RF link capability depending on link conditions. The embodiments disclosed herein provide such a terminal with minimal increase in size and weight and without taking up any additional valuable room, for example, on an earth-facing side of a small spacecraft.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s).

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Certain relative terms used in this disclosure, such as, for example, "about," "substantially," "generally," and "approximately" are used to indicate a possible variation of ±10% of a stated or understood value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended figures, FIG. 1. depicts a cross sectional view of a terminal 100 including an optical transceiver 102 according to some embodiments. As shown in FIG. 1, the terminal 100 may include a primary concave mirror 104 and a secondary concave mirror 106 with different focal lengths to provide magnification of an optical signal transmitted and/or received by the optical transceiver 102, as shown in FIG. 1. For example, the primary concave mirror 104 may have a relatively longer focal point than the secondary concave mirror 106. In some embodiments, the primary concave mirror 104 and the secondary concave mirror 106 may be positioned in a Gregorian arrangement as shown in FIG. 1. As shown in FIG. 1, the primary concave mirror 104 and the secondary concave mirror 106 may be arranged such that the focal points of the concave mirrors 104, 106 coincide at a point 108 relatively close to the secondary concave mirror 106. The mirrors 104, 106 may be arranged in an offset configuration to avoid blockage of optical signals 112. The terminal 100 may include an optical feed 110 in which optical signals 112 may pass through (e.g., transmitted and/or received) within the terminal 100. In some embodiments, the primary concave mirror 104 and the secondary concave mirror 106 may each comprise aluminum and/or any appropriate reflective material.

Figure 2:
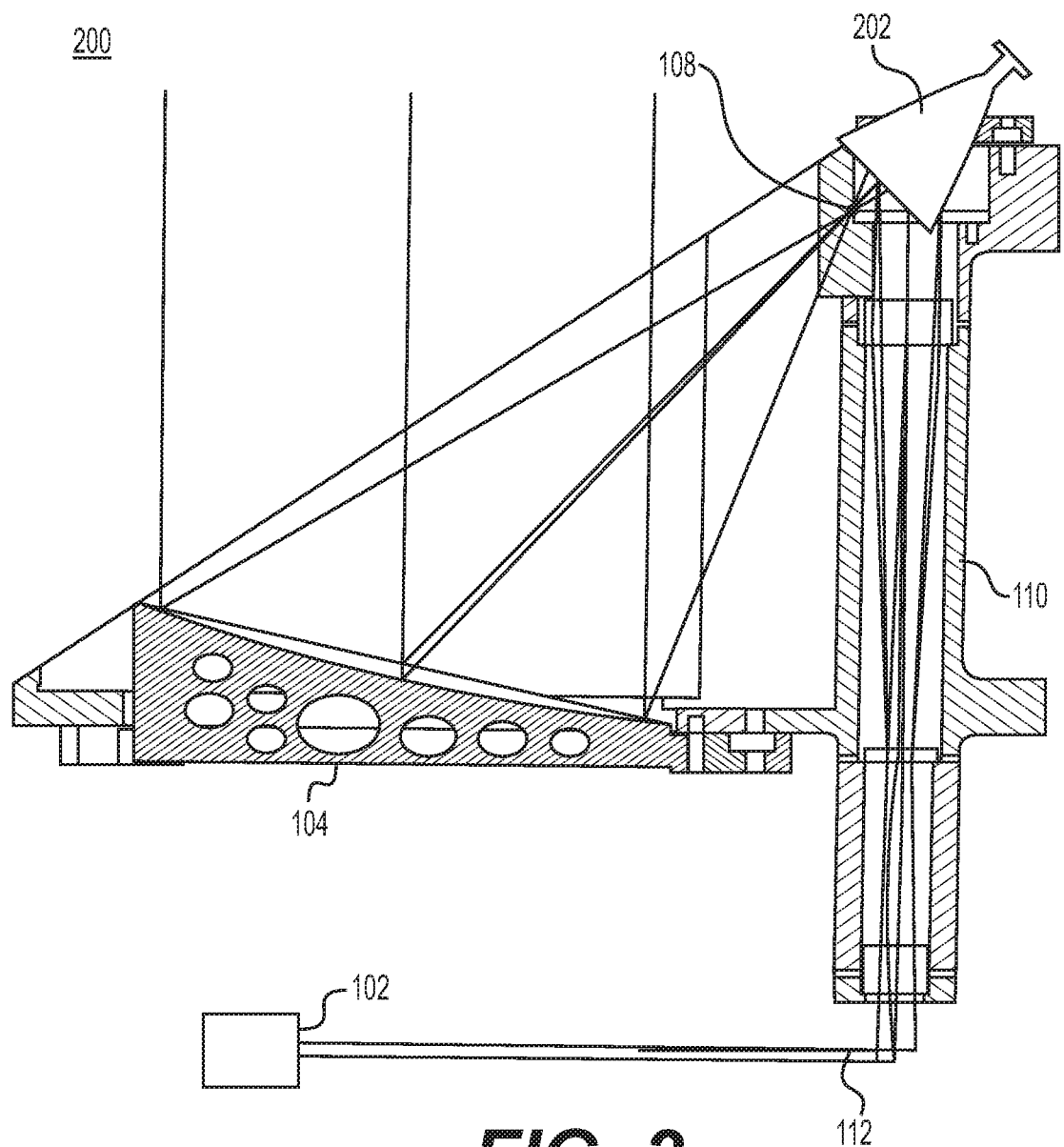
FIG. 2 depicts a cross sectional view of an exemplary terminal including an optical transceiver and an RF transceiver, according to some embodiments.

FIG. 2 depicts a cross sectional view of a terminal 200 including the optical transceiver 102 and an RF transceiver 202, according to some embodiments. The terminal 200 may include a primary concave mirror 104 and a secondary concave mirror 106 (not shown in FIG. 2), as depicted in and described with reference to FIG. 1. As noted above, the primary concave mirror 104 and the secondary concave mirror 106 may be arranged such that the focal points of the concave mirrors 104, 106 coincide at point 108 which may be relatively close to the secondary concave mirror 106. In some embodiments, an RF transceiver 202 (e.g., a feed horn 202) may be positioned adjacent to the point 108 and positioned such that the RF transceiver 202 may illuminate the primary concave mirror 104, as will be explained below.

In some embodiments, the RF transceiver may be connected to a back side of the feed horn 202 (i.e., the waveguide flange of the feed horn 202). For example, the RF transceiver may be positioned within the terminal 200 and may be connected to the feed horn 202 via an RF coaxial cable and/or an RF waveguide connection. In some embodiments, the feed horn 202 may produce an RF beam at RF frequencies. The RF beam may shine on to the primary concave mirror 104, and the reflected signal from the primary concave mirror 104 104 may have the beam shape and characteristics for RF transmission to the ground. In the context of the current disclosure, a feed horn 202 may be referred to as an RF transceiver.

In some embodiments, the RF transceiver 202 may be a single RF feed horn, as shown in FIG. 2. In some embodiments, the RF transceiver 202 may be positioned such that the RF transceiver 202 is offset from the point 108. In such embodiments, the RF transceiver 202 may illuminate the primary concave mirror 104 without blocking a path of the optical signal 112 being transmitted and/or received by the optical transceiver 102. In some embodiments, the boresight of the RF transceiver 202 and the boresight of the optical transceiver 102 may be offset. Accordingly, continuous use of an RF connection via the RF transceiver 202 and an optical connection via the optical transceiver 102 may be enabled by utilizing a coarse steering mechanism provided by the terminal 200 to point the relevant boresight, e.g., the boresight of the RF transceiver 202 or the boresight of the optical transceiver 102, towards a ground station. The terminal 200 may alternate between the RF connection and the optical connection utilizing the coarse steering mechanism. For example, the terminal 200 may be a telescope. In some embodiments, the telescope may be a 10 cm diameter telescope. The telescope may be configured to include the optical feed, e.g., the path 110 in which the optical signal 112 may pass through the terminal 200, as the primary link and include the RF transceiver 202 components in an offset position, e.g., a compromised position, from the optical feed. Accordingly, the optical boresight and the RF boresight would not coincide, and the telescope may be configured to provide a coarse pointing mechanism such that the telescope may alternate between the RF connection and the optical connection. In some embodiments, a 10 cm antenna may have a 5 degree half-beamwidth and provide data rates in the >100 Mbps range (for LEO) at 20 GHz depending on the transmit power and the size of the ground station, e.g., ground antenna.

In some embodiments, a single RF feed horn arrangement, as depicted in FIG. 2, may require a modification of a default or standard optical telescope design. This is because the f/D ratio (i.e., ratio of focal length to aperture size) of the primary concave mirror in the standard design is too high to be compatible with a feed horn of practical size. The optical design would need to be modified to reduce the focal lengths of the primary and secondary concave mirrors in proportion, thereby maintaining the same magnification and aperture. In some embodiments, an f/D ratio may be about half of the standard value, and a feed horn with a diameter of about 40 mm may provide appropriate illumination of the primary concave mirror 104. In other words, the focal lengths of the primary concave mirror 104 and the secondary concave mirror 106 may be reduced to 50% of the standard value, while leaving each respective diameter unchanged. This reduction may be achieved by providing a tighter curvature in the primary concave mirror 104 and/or the secondary concave mirror 106. In the context of the current disclosure, proper illumination is assumed to be a taper of −10 dB at the edge of the mirror, giving first sidelobes at about −20 dB. That is, proper illumination provides an RF signal strength at the edges of the mirror that is less (e.g., −10 dB) than at the center of the mirror, thereby ensuring a well-focused primary beam that maximizes the energy directed towards the ground station and minimizes side lobe energy directed in the wrong directions which may cause unwanted interference on the ground.

Figures 3A, 3B:
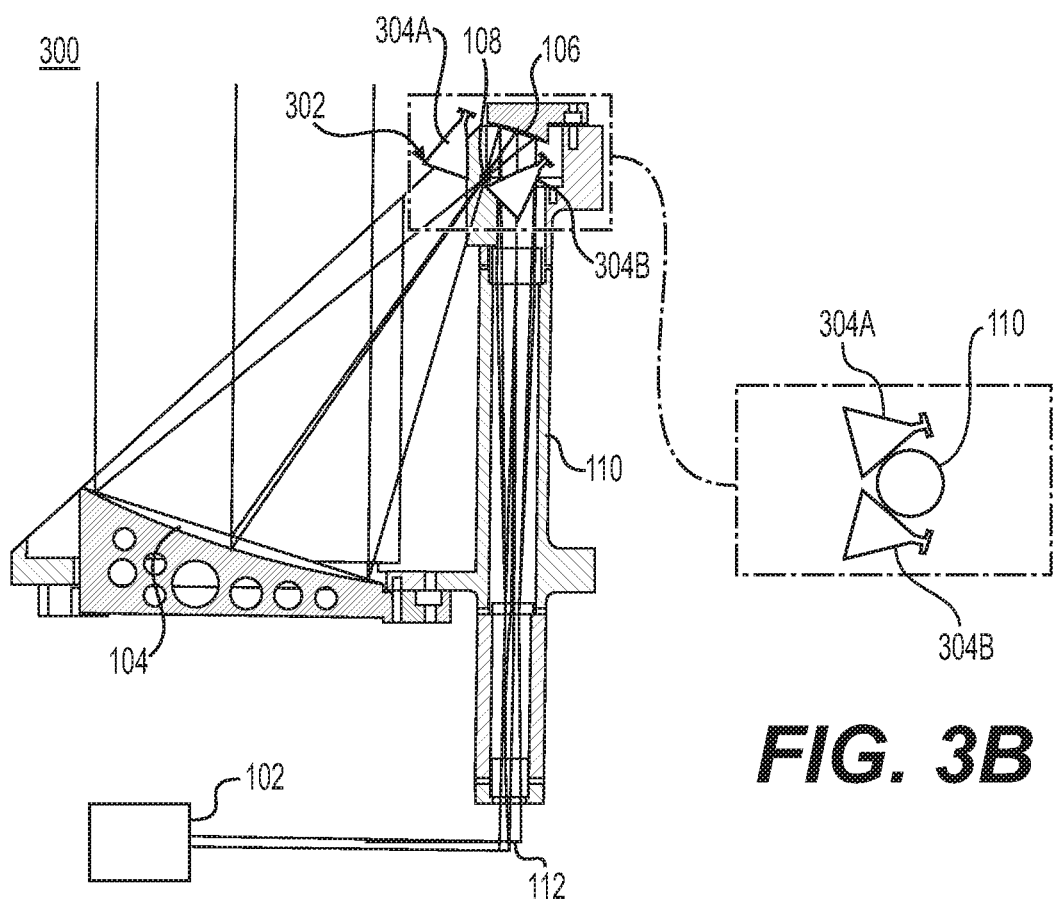
FIG. 3A depicts a cross sectional view of another exemplary terminal including an optical transceiver and an RF transceiver, according to some embodiments.
FIG. 3B depicts a top view of a portion of the terminal including the optical transceiver and the RF transceiver depicted in FIG. 3A, according to some embodiments.

FIG. 3A depicts a cross sectional view of a terminal 300 including the optical transceiver 102 and an RF transceiver 302 (i.e., an array 302 of feed horns), according to some embodiments. In some embodiments, the RF transceiver 302 may include an array 302 of feed horns 304A-B. The array 302 of feed horns 304A-B may be mounted symmetrically around point 108, as shown in FIGS. 3A-3B. In some embodiments, the feed horns 304A-B may be mounted to a plate or bracket configured to hold the feed horns 304A-B securely while avoiding blockage to the optical path. Accordingly, the optical signal 112 may pass through a center of the array 302 without blockage. In some embodiments, all of the feed horns 304A-B in the array 302 may be aimed at the primary concave mirror 104. Accordingly, the combination of the array 302 of feed horns 304A-B and the optical transceiver 102 may allow the optical and RF boresights to align. In some embodiments, there may be a RF beam squint caused by the use of a circular polarization in an offset configuration. The RF beam squint may be compensated by adjusting the position of one or more of the feed horns 304A-B in the array 302. Via the configuration depicted in FIGS. 3A-3B, the terminal 300 may rapidly switch between the optical and RF links and/or perform simultaneous operation via the optical and RF links.

In some embodiments, the combined RF signal strength of each of the feed horns 304A-B may be approximately the equivalent of the RF signal strength of the single feed-horn depicted in and described with reference to FIG. 2. In some embodiments, RF couplers may be utilized to supply the same RF signal to each of the feed horns 304A-B such that the array 302 may provide the appropriate illumination of the primary concave mirror 104 (e.g., −10 dB edge taper as explained above). In some embodiments, the RF couplers may be attached directly to the back side of each of the feed horns 304A-B (i.e., the waveguide flange of the feed horns 304A-B). As shown in FIG. 3A, the feed horns 304A-B may be angled inwards to provide clearance for the optical signal 112 between the primary concave mirror 104 and the secondary concave mirror 106. Each of the feed horns 304A-B may each have a wide beamwidth of about 60 degrees. Accordingly, the feed horns 304A-B may be angled inwards without significantly affecting the combined pattern from the array 302 and/or affecting the antenna performance. While FIGS. 3A-3B depict the array 302 as including two feed horns 304A-B, it is understood that the array 302 may include more than three feed horns in alternative embodiments. In some embodiments, the feed horns included in the array 302 may have a diameter of 20 mm or less.

For example, the array 302 may include four feed horns. In such instances, the terminal 300 may be configured to include tracking capability using the RF transceiver, e.g., the array 302 comprising the four feed horns. The tracking capability may have the significant advantage of assisting the optical transceiver 102 in acquiring a beacon under adverse weather conditions. That is, the tracking capability of the RF transceiver, e.g., the array 302 of feed horns, may allow the terminal 300 to accurately point at the ground station before initiating an optical beacon acquisition sequence. While the tracking capability of the terminal has been described with relation to the array 302 including four feed horns, it is understood that the tracking may be performed with any number of feed horns.

In some embodiments, the array 302 including four feed horns may be positioned in a square pattern with a center spacing of about 25 mm. In such embodiments, the optical signal between the primary concave mirror 104 and the secondary concave mirror 106 may pass between the center spacing. As shown in FIG. 3A, the center spacing of the array 302 may be positioned such that the point 108 falls in the center spacing.

It is understood that the shroud arrangement of the terminal 200, 300 shown in FIGS. 2 and 3A may require modifications in materials and shape to avoid scattering stray RF energy in unwanted directions, or blocking the RF radiation, and there might be some tradeoffs necessary between optical and RF performances. In other words, a shroud arrangement that is designed solely for optical performance may require some modification so that it also works at RF frequencies. For example, a black paint that works well to absorb stray light at optical frequencies may require supplementing with RF absorbing material to absorb stray RF energy.

Figure 4:
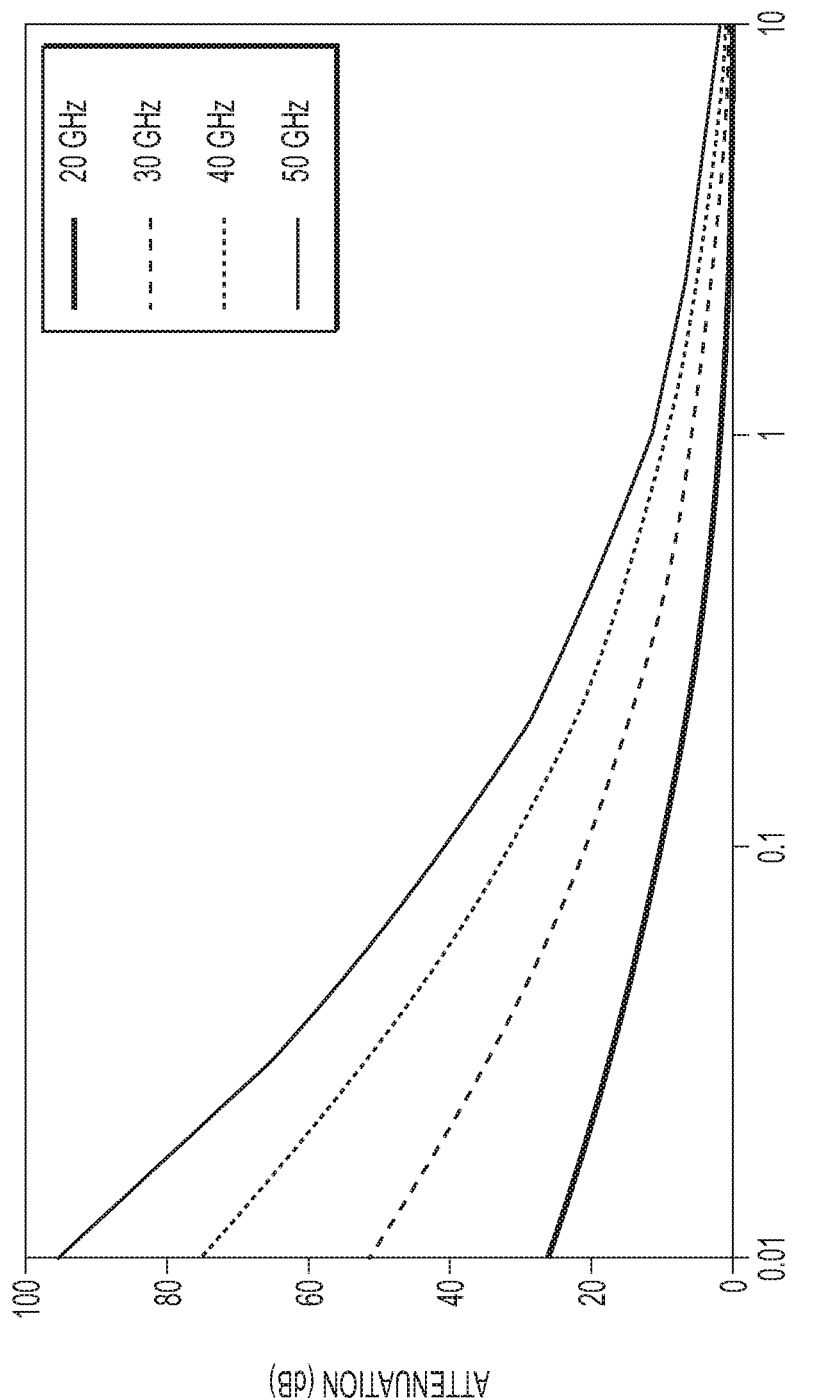
FIG. 4 depicts rain fade percentages at 20 degrees elevation, according to some embodiments.

A preliminary RF downlink budget is provided in Table 1 below. Table 1 demonstrates that a terminal as disclosed herein, e.g., as depicted in and described with reference to FIGS. 2, 3A, and 3B, with an RF frequency of 20 GHz and a transmit power of 10 W in combination with a received dish with a 2 m diameter may handle data rates in excess of 100 Mbps at a range of 2000 km in the presence of more than 10 dB of rain fade. As shown in FIG. 4, this level of atmospheric attenuation occurs less than 0.1% of the time and only for low elevation angles in the Northeastern United States, e.g., Washington, D.C. The use of adaptive communication protocols that reduce the data rate when necessary would allow RF communication to continue even for the small amount of time when the rain fade exceeded 10 dB. Adaptive communication protocols may change the data rate and coding scheme of the RF communications signal in response to changes in the signal-to-noise ratio of the link in order to maximize communication speed depending on link conditions.

| Item | Symbol | Units | Source | Budget |
|---|---|---|---|---|
| Frequency | f | GHz | Input parameter | 20.0 |
| Transmitter Power | P | Watts | Input parameter | 10.0 |
| Transmitter Power | P | dBW | 10 Log(P) | 10.0 |
| Transmitter Line Loss | LI | dB | Input parameter | −1.0 |
| Transmit Antenna Beamwidth | Theta-t | deg | Input parameter | 10.0 |
| Peak Transmit Antenna Gain | Gtp | dB | Equation (13-18) | 24.3 |
| Transmit Antenna Diameter | Dt | m | Equation (13-17) | 0.11 |
| Transmit Antenna Pointing Offset | et | deg | Input parameter | 1.0 |

-continued

| Item | Symbol | Units | Source | Budget |
|---|---|---|---|---|
| Transmit Antenna Pointing Loss | Lpt | dB | Equation (13-19) | −0.1 |
| Transmit Antenna Gain | Gt | dB | Gtp + Lpt | 24.2 |
| Equiv. Isotropic Radiated Power | EIRP | dBW | P + Ll + Gt | 33.2 |
| Propagation Path Length | S | km | Input parameter | 2000 |
| Space Loss | Ls | dB | Equation (13-21) | −184.5 |
| Propagation and Polarization Loss | La | dB | FIG. 13-10 | −0.5 |
| Receive Antenna Diameter | Dr | m | Input parameter | 2 |
| Peak Receive Antenna Gain | Grp | dB | Equation (13-16) | 49.8 |
| Receive Antenna Beamwidth | theta-r | deg | Equation (13-17) | 0.5 |
| Receive Antenna Pointing Error | er | deg | Input parameter | 0.1 |
| Receive Antenna Pointing Loss | Lpr | dB | Equation (13-19) | −0.4 |
| Receive Antenna Gain | Gr | dB | Grp + Lpr | 49.4 |
| System Noise Temperature | Ts | K | Table 13-9 | 727 |
| Data Rate | R | bps | Input parameter | 100,000,000 |
| Eb/N0 (1) | Eb/N0 | dB | Equation (13-11) | 17.6 |
| Carrier-To-Noise Density Ratio | C/N0 | dB-Hz | Equation (13-13) | 97.6 |
| Bit Error Rate | BER | — | Input parameter | 1.00E−05 |
| Required Eb/N0 (2) | Req Eb/N0 | dB-Hz | FIG. 13-9 | 4.4 |
| Implementation Loss (3) | — | dB | Estimate | −2.0 |
| Margin | — | dB | (1) − (2) + (3) | 11.2 |

The particular embodiments disclosed above are illustrative only and should not be taken as limitations, as the embodiments may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications, and equivalents as may be included within the spirit and scope of the inventions so that those skilled in the art should understand that they can make various changes, substitutions, and alterations without departing from the spirit and scope of the inventions in their broadest form.

Although various embodiments of the present disclosure have been illustrated and described in detail, it will be readily apparent to those skilled in the art that various modifications may be made without departing from the present disclosure or from the scope of the appended claims.

What is claimed is:

1. An antenna for transmitting and receiving a radio frequency (RF) signal and an optical signal, the antenna comprising:
    a primary concave reflector configured to provide a first focal length to a focal point;
    a secondary concave reflector configured to provide a second focal length to the focal point, wherein the focal point is located between the primary concave reflector and the secondary concave reflector, and wherein the first focal length is longer than the second focal length;
    an optical transceiver facing the secondary concave reflector, wherein the optical transceiver is configured to transmit and receive the optical signal via the primary and secondary concave reflectors, wherein a path of the optical signal passes through the focal point;
    one or more RF transceivers facing the primary concave reflector, wherein the one or more RF transceivers are positioned adjacent to the focal point and offset from the optical signal path, and wherein the one or more RF transceivers are configured to transmit and receive the RF signal via the primary concave reflector; and
    a controller configured to selectively activate the optical transceiver and/or the one or more RF transceivers.

2. The antenna of claim 1, wherein the one or more RF transceivers comprise one feed horn positioned at one side of the focal point,
    wherein an RF boresight for the feed horn is offset from an optical boresight for the optical transceiver, and
    wherein the controller is configured to alternately activate the optical transceiver and the feed horn.

3. The antenna of claim 2, wherein the controller is configured to alternately activate the optical transceiver and the feed horn by:
    utilizing a steering mechanism of the antenna to align the optical boresight to a target prior to activating the optical transceiver;
    activating the optical transceiver after the optical boresight is aligned with the target;
    utilizing the steering mechanism of the antenna to align the RF boresight with the target prior to activating the feed horn; and
    activating the feed horn after the RF boresight is aligned with the target.

4. The antenna of claim 1, wherein the one or more RF transceivers comprise an array of feed horns.

5. The antenna of claim 4, wherein the array of feed horns is positioned symmetrically around the focal point such that the focal point is located at a center of the array of feed horns.

6. The antenna of claim 5, wherein each feed horn included in the array of feed horns is tilted inwards towards the primary concave reflector.

7. The antenna of claim 5, wherein an RF boresight for the array of feed horns is substantially aligned with an optical boresight for the optical transceiver.

8. The antenna of claim 7, wherein the controller is configured to simultaneously and/or alternately activate the optical transceiver and the array of feed horns.

9. The antenna of claim 4, wherein the array of feed horns comprises four feed horns.

10. The antenna of claim 4, wherein the controller is configured to: (i) obtain a beacon signal via the array of feed horns, (ii) determine a target position based on the obtained beacon signal, (iii) utilize a steering mechanism of the antenna to align an optical boresight for the optical transceiver with the target position prior to activating the optical transceiver, and (iv) activate the optical transceiver after the optical boresight is aligned with the target position.

11. A communication terminal comprising:
    a primary concave reflector configured to provide a first focal length to a focal point;
    a secondary concave reflector configured to provide a second focal length to the focal point, wherein the focal point is located between the primary concave reflector and the secondary concave reflector;
    an optical transceiver facing the secondary concave reflector, wherein the optical transceiver is configured to transmit and receive an optical signal via the primary and secondary concave reflectors through the focal point;

one or more RF transceivers facing the primary concave reflector, wherein the one or more RF transceivers are positioned adjacent to the focal point and offset from a path of the optical signal, and wherein the one or more RF transceivers are configured to transmit and receive an RF signal via the primary concave reflector.

12. The communication terminal of claim 11, further comprising
a controller configured to selectively activate the optical transceiver and/or the one or more RF transceivers.

13. The communication terminal of claim 12, wherein the one or more RF transceivers comprise one feed horn positioned at one side of the focal point.

14. The communication terminal of claim 13, wherein the controller is configured to alternately activate the optical transceiver and the feed horn.

15. The communication terminal of claim 12, wherein the one or more RF transceivers comprise an array of feed horns, the array of feed horns being positioned symmetrically around the focal point such that the focal point is located at a center of the array of feed horns.

16. The communication terminal of claim 15, wherein each feed horn included in the array of feed horns is tilted inwards towards the primary concave reflector.

17. The communication terminal of claim 15, wherein an RF boresight for the array of feed horns is substantially aligned with an optical boresight for the optical transceiver.

18. The communication terminal of claim 17, wherein the controller is configured to simultaneously and/or alternately activate the optical transceiver and the array of feed horns.

19. The communication terminal of claim 15, wherein the array of feed horns comprises four feed horns.

20. The communication terminal of claim 11, wherein the first focal length is longer than the second focal length.

* * * * *